June 23, 1931.  C. M. DIBBLE  1,811,428
BROILER
Filed Dec. 31, 1926  3 Sheets-Sheet 1

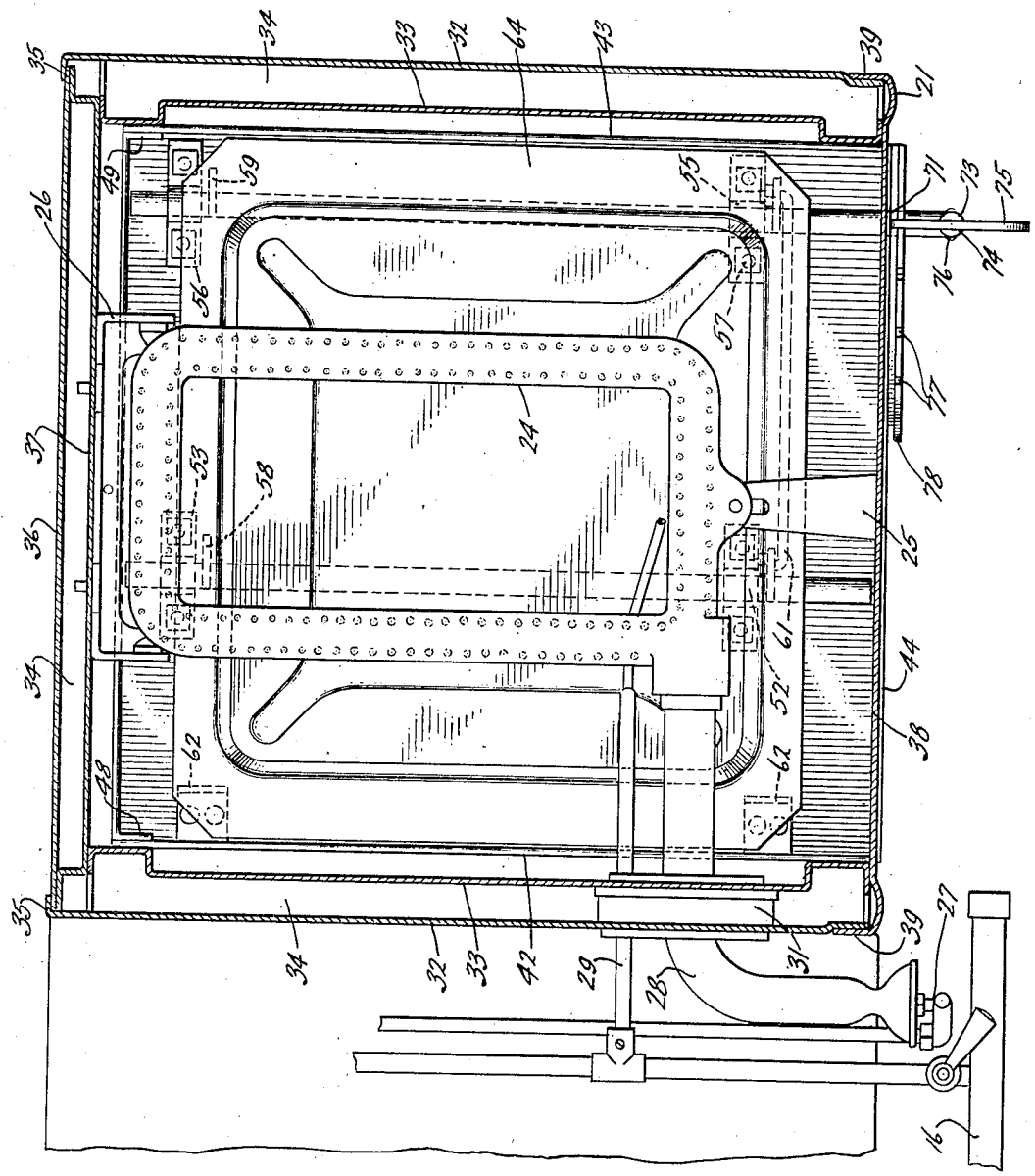

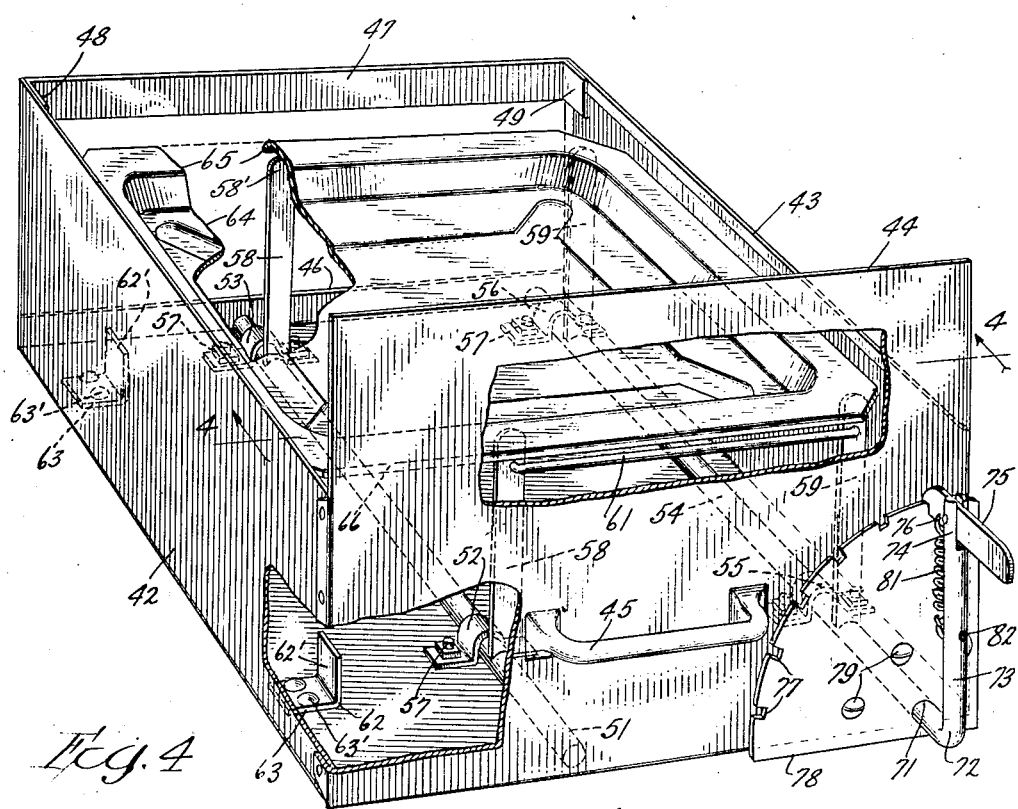
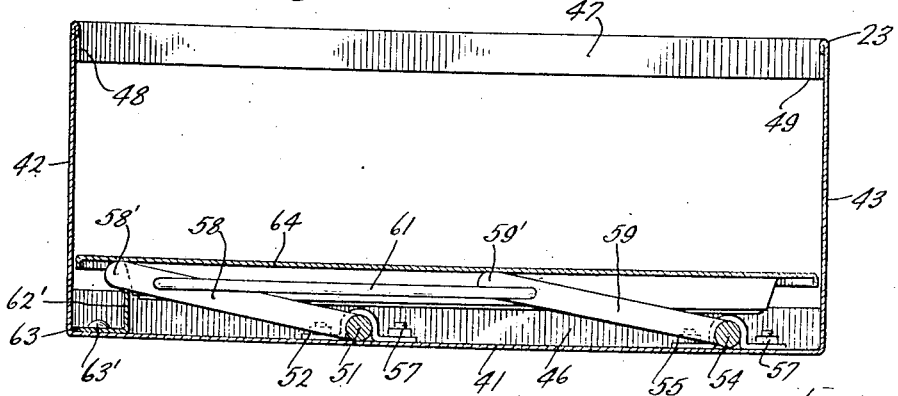

Patented June 23, 1931

1,811,428

UNITED STATES PATENT OFFICE

CLAUDE M. DIBBLE, OF JOLIET, ILLINOIS, ASSIGNOR TO MOORE BROTHERS COMPANY, OF JOLIET, ILLINOIS, A CORPORATION OF ILLINOIS

BROILER

Application filed December 31, 1926. Serial No. 158,194.

This invention relates in general to the construction of cooking stoves and more particularly to broiling ovens or broilers which are a part thereof.

Prior to my invention it has been customary to provide broiling ovens with a plurality of inwardly projecting horizontal fins mounted on the inner faces of the oven walls. The fins engage the edges of the broiling tray and support it in place. By engaging the tray with corresponding fins, it may be positioned at any desired distance from the broiling heat, the source of which is usually a gas burner disposed in the upper part of the oven. The oven is provided with a door hinged at its lower edge. During the processes of broiling meat it is necessary at first to position the meat close to the broiling heat in order to sear the meat on the surface. Thereafter it is necessary to move the meat away from the fire for the purpose of cooking it thoroughly throughout. In order to move the broiling tray containing the meat, the oven door must be opened, with consequent loss of heat, and the tray must be removed and re-positioned by hand, with consequent chance of burning the hand of the operator. The fins mounted on the interior side walls make cleaning thereof a difficult task.

A principal object of this invention is the provision of an improved broiling oven of simple construction and operation.

Another important object is the provision of means for raising and lowering a broiling tray within the broiling oven and means for adjusting the internal position of a broiling tray from without the broiling oven without opening the same.

Another important object is the provision of means for adjusting the position of a broiling tray within fine limits when it is near the broiling heat.

Another important object of the invention is the provision of a removable drawer in a broiling oven in which is mounted the broiling tray upon suitable supports, which is readily removable from the oven to facilitate cleaning.

Still another object of the invention is the provision in a broiling oven of a broiling tray mounted in a removable drawer in which the rear wall is removed in order that should an explosion occur in the oven, the drawer will be blown out of the oven and no serious damage done to the oven structure.

Numerous other objects of the invention will be apparent as it is better understood from the following description, which, taken in connection with the accompanying drawings, discloses a preferred embodiment thereof.

Referring to the drawings:

Fig. 2 is a section taken substantially on line 2—2 of Fig. 1 and constitutes a plan view of a broiling oven embodying my invention;

Fig. 3 is a perspective view of the broiler drawer of my invention; and

Fig. 4 is a sectional view of my broiler drawer taken substantially on lines 4—4 of Fig. 3.

Figure 1:
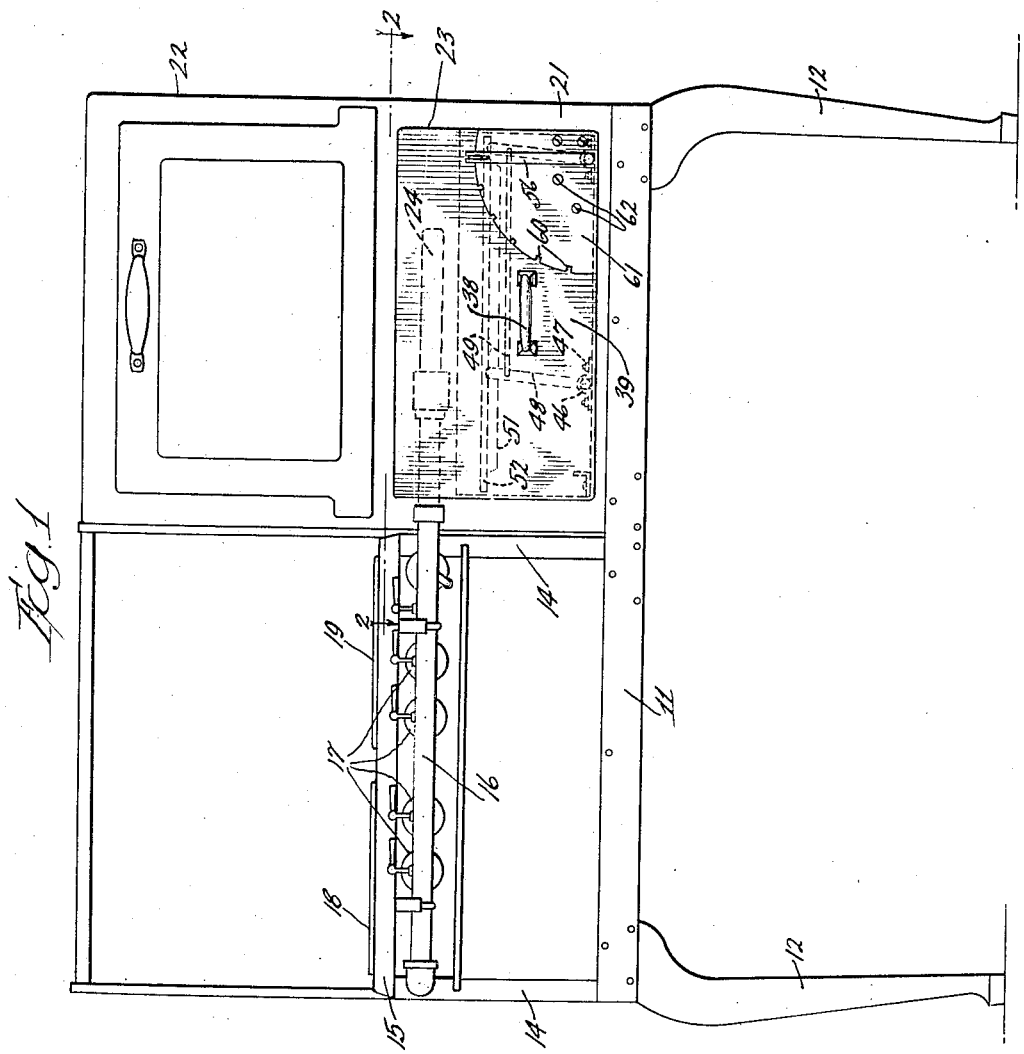
Figure 1 is a front elevation of a cooking stove containing a broiler embodying my invention.

To illustrate my invention I have shown a gas kitchen range comprising an open grate gas stove, a baking oven and a broiling oven mounted on a rectangular base plate 11 which in turn is supported by four legs 12 positioned, one at each corner of the base plate. The open grate gas stove comprises supports 14, stove bed 15, gas feed pipe 16, grate feeders 17 and grates 18 and 19 and is mounted on and occupies substantially one-half of the base plate 11. On the remaining portion of the base plate, the broiling oven 21 is mounted, and superimposed thereon is positioned the baking oven 22.

The broiling oven 21 comprises a rectangular compartment of sheet metal which encloses a drawer 23 removably mounted therein and a gas burner 24 mounted on brackets 25 and 26 attached to the front and rear walls of the compartment immediately above the drawer. The gas burner 24 is a hollow tube bent rectangularly and closed upon itself, and is connected to an external gas supply through suitable lead pipes 28 and control valves 27. The burner 24 produces broiling heat within the oven compartment. A pipe 29 of small diameter leads from the external gas supply pipe 16 and provides a pilot light to ignite the burner automatically when gas is introduced thereto. The pipes 28 and 29 enter the oven compartment through a conduit 31 positioned in the side wall thereof.

Each side wall of the oven compartment comprises spaced apart walls 32 and 33 of sheet metal suitably bent and disposed to provide air spaces 34 between the sheets comprising the walls.

The rear wall of the oven compartment comprises an outer wall 36 the ends of which are embraced by the outer side walls and an inner wall 37 spaced therefrom to provide an air space 34 therebetween.

The front wall 38 of the broiling oven comprises a metal sheet provided with a rectangular opening through which the drawer may be inserted into the oven, and having flanged edges 39 which embrace the ends of the side walls and hold them together. The sides, rear wall and front of the broiler are secured in any convenient manner such as by riveting or spot-welding.

The drawer 23 is constructed of sheet metal and comprises a rectangular floor 41 from the edges of which a front wall 44, side walls 42 and 43 and rear flange 46 are bent upwardly and fastened along their adjacent edges.

The front, side walls, rear flange and floor are made from a single sheet of metal, properly cut. The front 44 is of a size to fit and cover the opening in the front wall 38 of the oven compartment, but the side walls 42 and 43 are of less height in order that they may slide under the gas burner 24 when the drawer is pushed into place in the oven. A sheet metal strip 47, lying in the plane of the rear flange 46 and having inwardly extending flanges 48 and 49 is secured between the top rearmost corners of the sides 42 and 43 to space them apart and give added strength to the structure. A handle 45 is positioned on the front wall 44 to facilitate insertion and withdrawal of the drawer from the oven compartment.

The rear wall is purposely omitted for the reason that when an explosion occurs within the oven, the force of the explosion is directed against the front wall of the drawer and the rear wall of the oven directly and blows the drawer out of the oven. The pressure within the oven is thus relieved so that no serious injury results to the interior of the oven.

A cylindrical rod 51 is positioned upon the floor 41 parallel to the side wall 42 and spaced therefrom. This rod is secured in position by two bearing clamps 52 and 53 which embrace the rod at points near its opposed ends and which are secured to the floor as by bolts and nuts 57. The rod is free to turn about its axis within the clamps. The rod is provided near each end with a laterally extending finger 58 which fingers are attached thereto and lie in the same radial plane.

A rod 54 similar to rod 51 is rotatably secured to the floor by clamps 55 and 56 and lies parallel with rod 51. Lateral fingers 59 similar to fingers 58 are similarly secured to rod 54. A connecting rod 61 equal in length to the distance between rods 51 and 54 joins the tips 58′ and 59′ of the forward fingers of the rods to provide spaced relationship of the finger tips and to maintain parallelism of the fingers of adjacent rods during rotation thereof.

Rod 54 is positioned as close to side wall 43 of the drawer as clamps 55 and 56 permit. Rod 51 is spaced from side 42 a sufficient distance to accommodate the fingers 58 between supporting rod 51 and side wall 42, when the fingers are horizontal. This construction permits the fingers to rotate from vertical to horizontal position. Further rotation in one direction is prevented by the side wall 43 and in the other direction by stops 62, comprising angle irons having upstanding portions 62′ and legs 63 fastened to floor 41 by rivets 63′.

A broiling tray 64 is provided with a flanged edge, and adapted to be supported upon the finger tips 58′ and 59′ which slidingly engage the under sides of the front and rear flanges 65 and 66 of the tray. The finger tips all lie in a plane which is always parallel to the floor of the drawer but which is at a variable distance therefrom depending upon the angularity of the fingers. The angularity of the fingers is controlled by the rotation of rod 54 so that the broiling tray 64 is but spaced from the drawer floor by a distance determined by the rotation of the rod 54.

Rod 54 extends forwardly through the front wall 44 of the drawer 23 at 71. At 72 outside the wall, the rod is bent at right angles to form a crank arm 73 which extends substantially parallel with the lateral fingers 59. The crank arm so formed furnishes a means outside the drawer for rotating the rod 54 and hence raising or lowering the broiling tray 64 within the drawer.

To lock the crank arm in any desired angular position, and so lock the tray at any desired height within the drawer, the crank arm 73 is provided with a diametral slot in its free end, as at 74. A catch member 75 is pivotally mounted in the slot by a pin 76 passing through the rod. The catch member is arranged to detachably engage radial notches 77 provided at intervals in the curved edge of a quadrant 78 of sheet metal, which is mounted upon the front wall 44 of the drawer and secured thereto by screws 79. The catch 75 is held in engagement with the notches by a spring 81 one end of which is attached to the catch while the other end is fastened to the crank arm 73 at any convenient point 82.

By turning the crank 73 to a desired position and engaging the catch 75 in one of the notches to lock the crank in place, the broiling tray 64 is positioned at a height within the drawer corresponding to the position of the crank arm. In this way the tray may be positioned at any desired distance from the broiling heat.

Although the crank arm 73 moves through the same angle from notch to notch, the corresponding change in height of the broiling tray becomes less as it reaches its highest position, which is the position at which the tray is nearest the broiling heat. This circumstance permits of fine adjustment of the distance between tray and broiling heat at times when delicacy of adjustment is most necessary to successful broiling. When a fine adjustment is not needed, that is, when the broiling tray is at a far position from the broiling heat, the adjustment is coarse. This is a novel feature of the invention and has not been used in stove construction heretofore.

It is thought that the invention and many of its attendant advantages will be understood from the foregoing description, and it will be apparent that many changes may be made in the form, construction and arrangement of the parts without departing from the spirit and scope of the invention or sacrificing all of its material advantages, the form herein described being merely a preferred embodiment thereof.

I claim:

1. In a broiling oven, an oven compartment, a source of heat positioned within the compartment, a drawer positionable within the compartment providing a closure therefor, a plurality of fingers mounted in the drawer pivoted for rotation in vertical planes transverse the drawer, and a broiling tray slidingly supported by the fingers.

2. A broiler oven comprising an oven compartment, a source of broiling heat positioned therein and a drawer closure therefor, said drawer containing a loosely mounted tray and a plurality of interconnected externally controllable fingers slidingly supporting said tray, the fingers being rotatable in vertical planes.

3. In a broiler oven explosion relief, a drawer closure for the oven compartment, the drawer comprising a plurality of pivotally mounted fingers, a broiling tray slidingly mounted therein, a cut-away rear wall and a front wall providing a closure for the oven compartment.

4. In a broiler oven, an oven compartment, a source of heat positioned therein, a drawer closure therein, said drawer having a cut-away rear wall and a front wall providing a closure for the compartment, said drawer having a plurality of interconnected externally controllable pivotally mounted fingers, and a broiling tray slidingly mounted thereon, the drawer assembly being adapted to be forced from the oven by explosive pressure acting upon the front closure wall.

5. In combination with a broiler compartment of a range, a drawer withdrawably mounted in said compartment, link adjusting-mechanism mounted in said drawer and equipped with means for supporting a broiler-pan, and actuating means for said mechanism extending through the front end of said drawer.

6. In combination, a broiler-drawer having a front end adapted to serve as a closure for a broiler-compartment, link adjusting-mechanism mounted in the lower portion of said drawer and equipped with means for supporting a broiler-element, and actuating means for said mechanism having a handle disposed exteriorly adjacent the lower front corner of the drawer.

7. In a fluid fuel burning stove, the combination of a broiler compartment open at its front, a broiler burner arranged at the top of said compartment, a drawer mounted in said compartment beneath said burner and having a front wall larger than the opening into said broiler compartment and adapted to close said opening, and means in said drawer and independent of its side walls for supporting a broiler pan at various distances from said burner.

8. The combination of a broiler compartment of a range, a drawer withdrawably mounted in said compartment, pan supporting mechanism mounted in said drawer, and actuating mechanism extending through the front of the drawer for vertically adjusting said mechanism to dispose the pan at various heights above the drawer bottom.

9. In a fluid fuel burning stove, the combination of a broiler compartment open at its front, a broiler burner arranged at the top of said compartment, a drawer mounted in said compartment beneath said burner and having a front wall to close said opening, and means in said drawer and independent of its sides for supporting a broiler pan at various distances from said burner.

CLAUDE M. DIBBLE.